United States Patent [19]
Weh et al.

[11] Patent Number: 6,073,971
[45] Date of Patent: Jun. 13, 2000

[54] FITTING ARRANGEMENT

[75] Inventors: Wolfgang Weh; Erwin Weh, both of Illertissen, Germany

[73] Assignee: Weh GmbH Verbindungstechnik, Illertissen, Germany

[21] Appl. No.: 09/142,082

[22] PCT Filed: Feb. 27, 1997

[86] PCT No.: PCT/EP97/00959

§ 371 Date: Dec. 29, 1998

§ 102(e) Date: Dec. 29, 1998

[87] PCT Pub. No.: WO97/32154

PCT Pub. Date: Sep. 4, 1997

[30] Foreign Application Priority Data

Feb. 29, 1996 [DE] Germany ..................... 296 03 734 U

[51] Int. Cl.$^7$ ....................................... F16L 35/00
[52] U.S. Cl. ........................ 285/35; 285/101; 285/906; 285/24
[58] Field of Search ................................ 285/33, 24, 34, 285/27, 35, 101, 308, 906; 141/312; 279/2.09, 2.12, 2.24

[56] References Cited

U.S. PATENT DOCUMENTS

| | | | |
|---|---|---|---|
| 1,297,719 | 3/1919 | Myers | 285/35 |
| 2,259,137 | 10/1941 | Iftiger | 285/35 |
| 3,124,076 | 3/1964 | Bodine | 285/33 |
| 3,757,836 | 9/1973 | Masuda | 285/35 |
| 4,534,995 | 8/1985 | Weh et al. | 285/35 |
| 5,685,574 | 11/1997 | Kohli et al. | 285/35 |

FOREIGN PATENT DOCUMENTS

| | | |
|---|---|---|
| 202592 | 11/1986 | European Pat. Off. . |
| 9204384 | 7/1992 | Germany . |

*Primary Examiner*—Dave W. Arola
*Attorney, Agent, or Firm*—Knobbe, Martens, Olson & Bear, LLP

[57] ABSTRACT

A clamping jaw arrangement for a clamp system includes several clamping jaws and a fitting arrangement. The clamping jaws are coupled to an actuating device and located in a radially spreadable manner in a casing around a spreader mandrel. The fitting arrangement is configured for the spreader mandrel and formed as a star-shaped fitting, which is mounted in the casing in a peripheral area of the clamping jaws and at an inner end of the spreader mandrel. The fitting includes at least three spokes, which are radially aligned between two respective clamping jaws.

18 Claims, 5 Drawing Sheets

Fig. 5
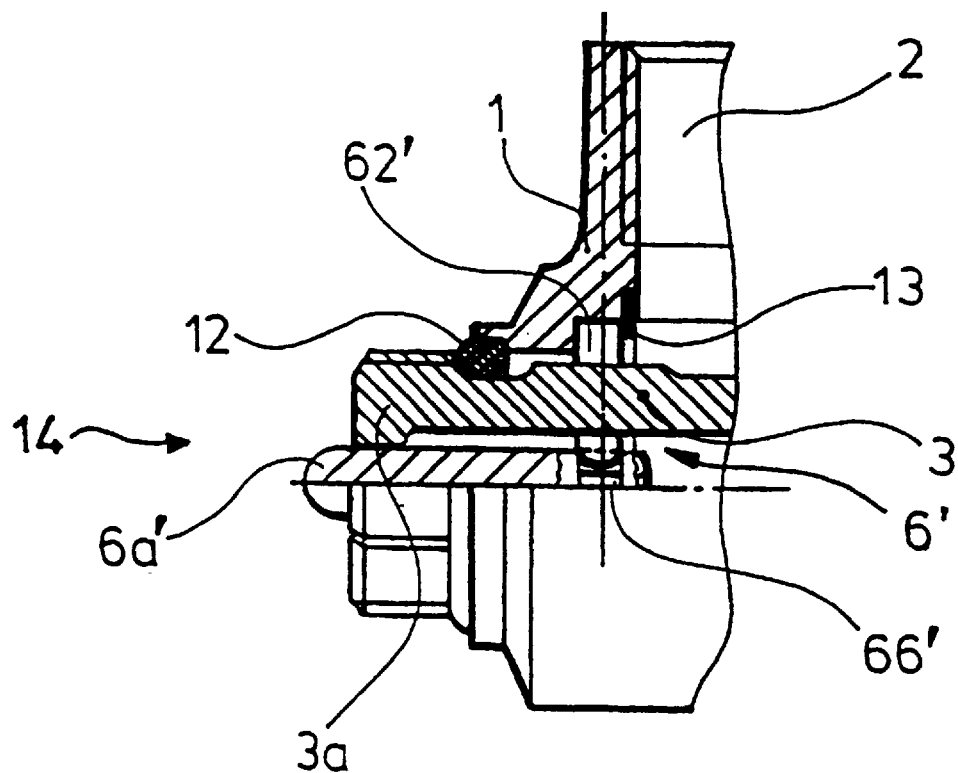
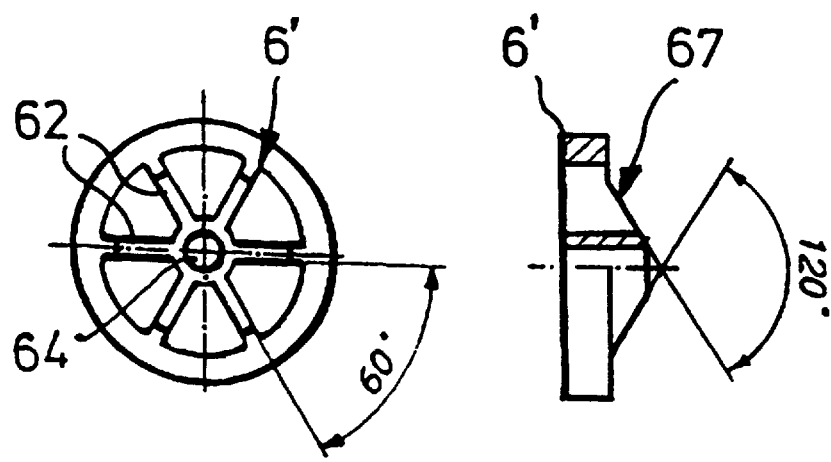
Fig.6a  Fig.6b

FITTING ARRANGEMENT

FIELD OF THE INVENTION

The invention relates to a fitting arrangement, particularly in clamping systems or snap-fit couplings for gaseous and/or liquid media, in which a clamping jaw arrangement coupled to an actuating device is located with a plurality of clamping jaws in a casing, radially spreadable around a spreader mandrel.

BACKGROUND OF THE INVENTION

Such clamp systems or snap-fit couplings enable a rapid and reliable connection to gas bottles for example, so that time-consuming screwing on and unscrewing at the connection counterpiece is eliminated. The clamping jaws suspended in a clamp piston thus engage positively in internal and external threads, collar nozzle and flange connections etc. Furthermore, such clamp systems or snap-fit couplings as a rule have a spreader mandrel, about which the clamping jaws are located at the forward end of the structure, the clamping jaw arrangement coupled to the actuating device being movable relative to the spreader mandrel in the axial direction, in order in this way to bring the clamping jaws into the engagement position or to disengage them from a connection counterpiece. Thus the clamping jaws project with their forward connection ends beyond the forward edge of the spreader mandrel and are pressed together for example by means of a resilient O-ring located around them in such a way that the clamping jaws are radially pivoted and the snap-fit couplings can be inserted into the connection counterpiece. Renewed actuation of the actuating device causes a renewed axial displacement of the clamping jaw arrangement relative to the spreader mandrel, but in the direction into the casing, so that the clamping jaws are radially spread by the spreader mandrel and the clamping jaws pass into secure and reliable engagement with the connection counterpiece.

A disadvantage of such a structure is however that the clamping jaws, seen in the peripheral direction, are displaceable radially to one another. In this way engagement profiles are formed which, depending on the degree of the radial spacing of the clamping jaws from one another, form an engagement profile which deviates more or less from the engagement profile of the connection counterpiece. For example, by means of a snap-fit coupling with six clamping jaws, which are intended to engage in a circular connection of a counterpiece, by a radial arrangement of the clamping jaws, in which not all the clamping jaws have the same or roughly the same spacing from one another, an engagement profile can only be formed which is not entirely circular. Upon connection to the counterpiece of a gas bottle for example, therefore due to the imprecisely-fitting connections, tilting due to non-uniform support can occur, which can result both in increased wear on material and a lack of seal of the connection. In addition the clamp system, due to the spreader mandrel mounted on the rear portion of the casing, is relatively long.

SUMMARY OF THE INVENTION

Accordingly the object underlying the invention is to provide a fitting arrangement of the type described, which enables radial alignment of the clamping jaws in both the spread and non-spread arrangement, so that a precisely-fitting connection to a corresponding connection counterpiece is possible.

Accordingly, a fitting device is designed as a star-shaped fitting, and mounted in the peripheral area of the clamping jaws in the forward area of the casing. The star-shaped fitting in this case is constructed in one or more parts from a spreader mandrel and a spoke ring, the spoke ring having at least three spokes, which form in the spoke ring continuous through openings for the clamping jaws, and furthermore are so arranged that the spokes are aligned radially between two respective clamping jaws. This means that, for example in the case of six clamping jaws, either three spokes are so arranged that the clamping jaws are respectively separate from one another in pairs and are radially aligned or, in a preferred manner, six spokes are so designed that one spoke in each case is located between two adjacent clamping jaws. This enables precise fixing of the radial distance between the clamping jaws, which in this way are so aligned that they have an identical spacing apart, thus ensuring that the clamping jaws form an engagement profile which corresponds to that of the connection counterpiece, so that a precisely-fitting connection without tilting of the engagement profiles is enabled and irregular support is avoided. At least three spokes however are in this case necessary in order to support the entire fitting arrangement in a statically defined manner on the casing. Of course, at least three spokes can be combined with at least three clamping jaws in an optional manner, i.e. for example four spokes with eight clamping jaws or five spokes with five clamping jaws, etc.

Further advantageous developments form the subject-matter of the subclaims. Thus the spoke ring of the two-part star-shaped fitting can in a preferred way have an internal annular ring, which is formed integrally with the spokes and has an aperture for receiving the spreader mandrel. The aperture receiving the spreader mandrel can in this case have a circular shape, into which the spreader mandrel is fitted with a corresponding projection, for example in the fashion of a feather key connection. Also imaginable would be an aperture into which a thread is cut, so that the spreader mandrel having a threaded pin is simply screwed in, or also a polygonal aperture, in which a corresponding spreader mandrel is fitted or secured against release in another way, for example by means of a securing ring. Further possibilities of secure connection between spreader mandrel and spoke ring, not named here, are known to persons skilled in the art.

Further, the spoke ring comprises in a preferred way an external annular ring, integrally formed with the spokes, e.g. constructed as a stamped or cast part. For fixing in the axial direction, the spoke ring in this case is held in the casing by means of a securing ring. This external annular ring can however also be provided on its external periphery with a thread, in order to enable the star-shaped fitting to be screwed into the casing in order to provide a stable and non-rotatable arrangement, fixing in the axial direction also being additionally effected in this way. Such a non-rotatable arrangement is particularly advantageous if the spreader mandrel is screwed to the spoke ring, as then the spreader mandrel can be screwed out from the front side of the casing in a simple manner, this however only being possible if the spoke ring cannot rotate with it. Of course, the spoke ring can be non-rotatably secured in the casing also by means of a press-fit or in another way well known to the person skilled in the art.

In order to ensure a particularly simply constructed stable and compact structure of the star-shaped fitting, the spoke ring of the star-shaped fitting may also be so formed that it is insertable from the front into the casing of the snap-fit coupling. For this purpose the star-shaped fitting is for example in the form of a screw sleeve, which is screwed into the casing from the forward side of the connection. This embodiment is of advantage because then the star-shaped fitting need not be dismantled from the rear side through the casing, but from the front. Likewise, a star-shaped fitting insertable in this way from the front side can also be inserted and fixed in the casing in another way, for example by means of a screw connection.

Of course, the star-shaped fitting may also be of a one-piece design, i.e. the star-shaped fitting can have an external annular ring, which is integrally connected to the spreader mandrel via spokes integrally connected therewith. In this embodiment also, the external ring can again be formed with an outer peripheral profile secured against rotation, for example with knobs or a thread.

Furthermore, the star-shaped fitting may also be constructed merely from spreader mandrel and spokes, the spokes either being integrally formed with the mandrel or a rear end of the spreader mandrel having for example a spline-shaped profile, into which the spokes are inserted in the radial direction. For securing against rotation, the spokes in this case can be inserted into a corresponding profile in the casing, e.g. groove-shaped apertures. In order to secure the star-shaped fitting in the axial direction, a securing ring is inserted into the casing.

In such a construction according to the invention it is thus ensured that the clamping jaws of the clamp system, particularly of the snap-fit coupling, are aligned at the same distance from one another and radially in a simple way, either individually or in pairs, by means of a star-shaped fitting constructed from the spreader mandrel and spoke ring. This ensures that the clamping jaws with their respective engagement profiles engage in a uniform manner with the engagement profile of the connection counterpiece, resulting in lower stress on the parts.

BRIEF DESCRIPTION OF THE DRAWINGS

The invention will be explained and described in more detail in the following with reference to the annexed drawings, which show:

FIG. 5 a snap-fit coupling with clamping jaws in the engaged position, the star-shaped fitting being made up of spokes and spreader mandrel; and FIGS. 6a, 6b a cast embodiment of the star-shaped fitting.

DETAILED DESCRIPTION OF THE INVENTION

Figure 1:
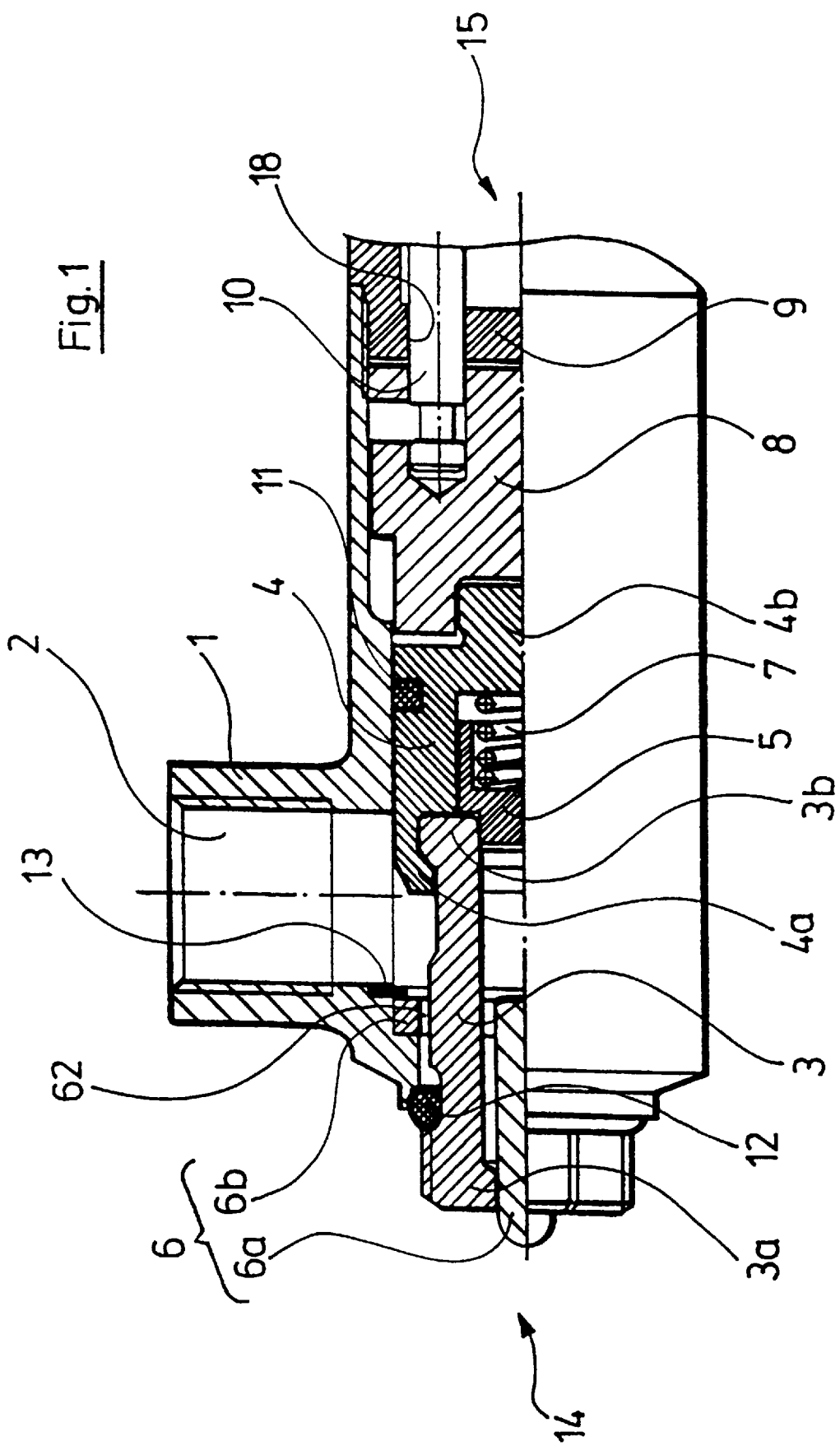
FIG. 1 a clamp system constructed as a snap-fit coupling with clamping jaws in the engagement position.

The invention will be described in the following with reference to the example of a snap-fit coupling for gaseous and/or liquid media, but can be used just as well in machine tools as a clamp system for tools. FIG. 1 shows a clamping jaw device in a snap-fit coupling, which has a forward casing portion 1 and a rear casing portion 9, but which however can also consist of a one-piece casing sleeve. The forward casing portion 1 comprises a clamping jaw arrangement 3,4 which consists of a plurality of clamping jaws 3 and a clamp piston 4 as an axially displaceable clamp member. The clamping jaws 3 are coupled via the clamp piston 4 with a forward portion 8 of an actuating device, which is substantially accommodated by the rear casing portion 9. In the snap-fit coupling shown here, the forward casing portion is provided with an inlet or outlet opening 2 for liquid and/or gaseous media. At its forward end 4a facing the clamping jaws 3, the clamp piston 4 has an aperture, in which there engages in a positive manner a complementary rear bearing end 3b, facing the clamp piston 4, of the clamping jaws 3. The forward connection end 3a of the clamping jaws 3 is in this embodiment provided with an external thread, but can also consist of an internal thread, a bead, groove or other profile shapes, which enable a positive profile engagement with a connection counterpiece, e.g. a nipple or a profiled bolt.

Located in the interior of the clamping jaw arrangement 3,4 is a hat-shaped fixing element 5, relatively displaceable thereto, which holds the rear bearing end 3b of the clamping jaws 3 in the forward end 4a of the clamp piston 4. The fixing element 5 thus ensures a positive bearing of the clamping jaws 3 in the clamp piston 4 and has on its rear side a collar which accommodates in its interior a resilient elastic member 7, for example a compression spring.

According to the invention, there is located in the forward portion of the casing 1 a star-shaped fitting 6, which is built up from a spreader mandrel 6a and a spoke ring 6b. The spoke ring 6b has at least three spokes 62 which together form continuous openings for the clamping jaws 3, whose connection ends 3a are supported in the engaged position on the spreader mandrel 6a (FIG. 1). The star-shaped fitting ensures that the clamping jaws 3, seen in the peripheral direction, either in pairs or individually, have roughly the same radial spacing from one another, i.e. the spokes 62 are radially aligned between two respective clamping jaws 3 (see FIG. 4a and 6a). As FIG. 1 shows, the star-shaped fitting 6 is axially secured by means of a securing ring 13 in the forward casing portion 1. Of course, the spoke ring 6b can be installed with a press fit in the casing, or other connections well known to the person skilled in the art can be provided between the casing 1 and the outer periphery of the spoke ring 6b.

Figure 2:
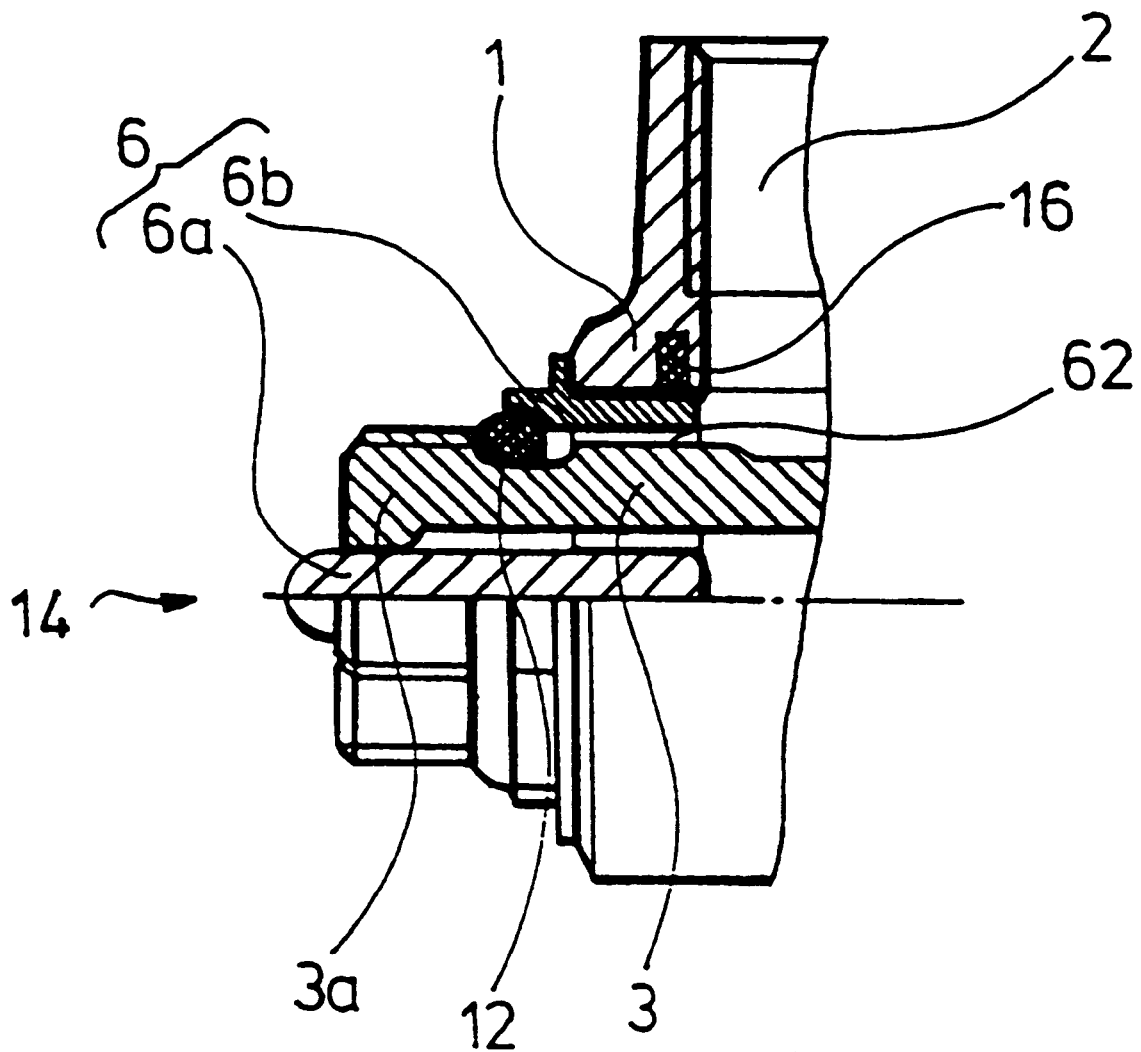
FIG. 2 a snap-fit coupling with clamping jaws in the engaged position, the star-shaped fitting being in the form of a screw sleeve.

In particular, the starshaped fitting 6, as FIG. 2 shows, can be formed with its outer ring 6b also as a sleeve, and can also be inserted into the forward casing portion 1, for example as a screw sleeve insertable from the forward side 14 into the casing and fixable therein. Such a construction as a screw sleeve insertable from the forward side 14 facilitates assembly in case of change-over of the star-shaped fitting 6. Whereas in the embodiment shown in FIG. 1, removal of the star-shaped fittings 6 is only possible by dismantling the snap-fit coupling from the rear side 15, in the embodiment in FIG. 2 removal of the star-shaped fitting can be done by simple unscrewing of the external spoke ring or of the screw sleeve 6b from the forward side 14 of the casing 1. However in this case an additional seal member 16 is inserted between the screw sleeves 6b and the casing 1, in order to ensure a pressure-tight connection. A further advantage of such a construction resides in the fact that the sleeve-shaped external spoke ring 6b, seen in the axial direction, can have a greater width than is the case with a star-shaped fitting to be inserted from the rear side, as the overall wall thickness of the forward portion of the casing 1 is available for the design of the width of the spoke ring 6b, which in addition ensures a compact and stable structure, resistant to high pressures, of the star-shaped fitting 6, but in particular of the spokes 62.

As FIG. 1 further shows, a seal member 11 is also provided between the clamp piston 4 and the forward casing portion 1, in order to ensure, in the fluid line between opening 1 and connection end 3a, a corresponding seal in the interior of the casing.

Figure 3:
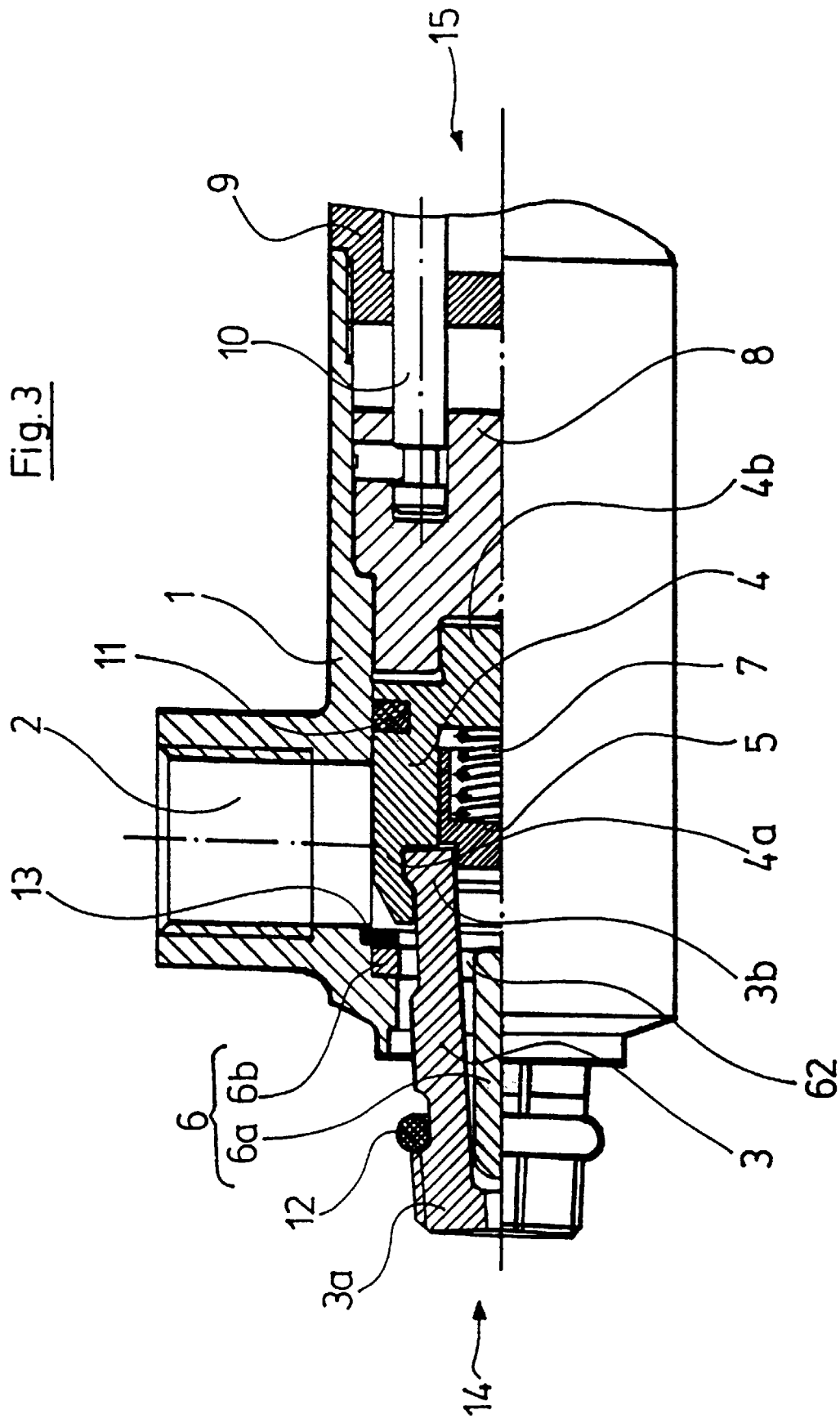
FIG. 3 a snap-fit coupling with clamping jaws in the released position.

FIG. 1 shows the clamping jaws 3 in their radially spread engaged position with a connection counterpiece not shown in further detail. If an actuating device, not shown in further detail, is actuated, e.g. via a lever or a handle, then an actuating pin 10 is displaced relative to the rear casing portion 9 in the axial direction towards the left, i.e. in the direction of the left-hand edge of the illustration, said actuating pin 10 being passed through an aperture 18 in the rear casing portion 9 and connected with the forward portion 8 of the actuating device, which is in turn coupled to the rear portion 4b of the clamp piston 4. Thus the clamping jaw arrangement 3,4 is displaced to the left together with the fixing element 5 relative to the forward casing portion 1 and the star-shaped fitting 6, likewise in an axial direction, as shown in FIG. 3. The clamping jaws then project through the spokes 62 of the star-shaped fitting 6 and with their forward connection ends 3a beyond the forward edge of the spreader mandrel 6a, being pressed together by means of the resilient O-ring 12 located around them. In order that the clamping jaws 3 can execute this radial pivoting movement, the fixing element 5 must simultaneously slightly deviate towards the right-hand edge of the illustration in an axial direction, i.e. be movable relative to the clamping jaw arrangement 3,4, without however releasing the locking action of the clamping jaws 3. This minimum axial mobility of the fixing member 5 is ensured by the resilient elastic member 7. In the radially compressed position, the forward connection end 3a of the clamping jaws 3 can be introduced into a connection counterpiece with an internal thread, and then upon renewed actuation of the actuating device can be brought back in the opposite direction into the spread engagement position shown in FIG. 1. In this engaged position the seal ring 12 in addition undertakes the seal, shown in FIG. 1, against escape of the media into the environment.

Figure 4A:
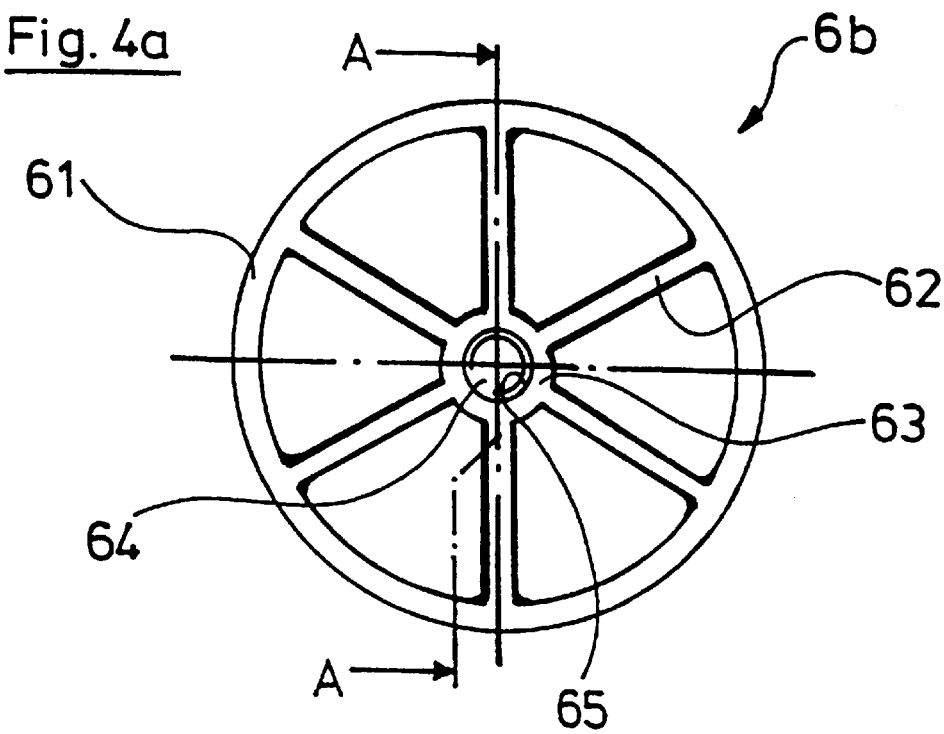
FIGS. 4a to c a two-part embodiment of a star-shaped fitting.
Figure 4B:
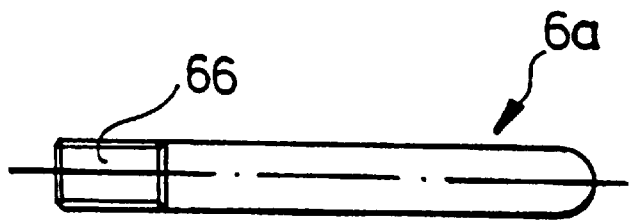
Figure 4C:
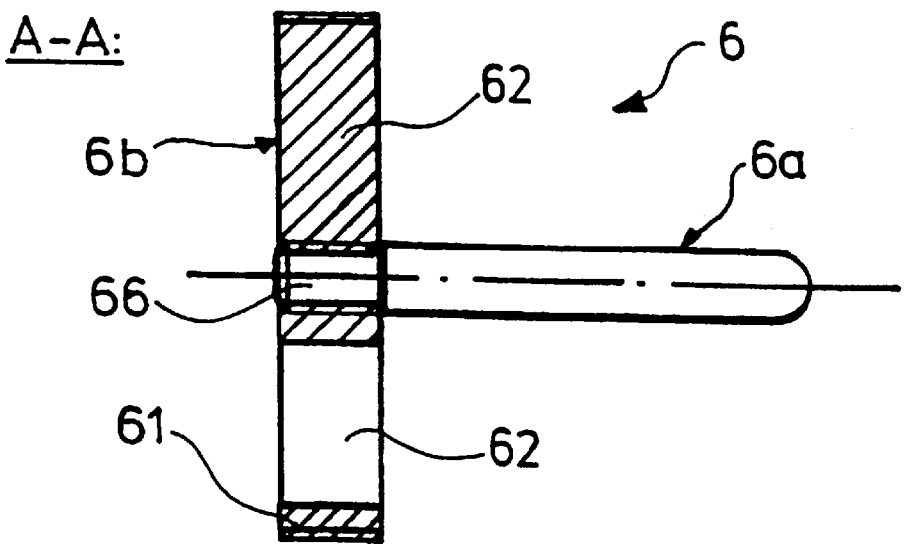

FIGS. 4a, 4b and 4c show a detailed view of a preferred embodiment of the star-shaped fitting 6, which is built up in two parts from a spoke ring 6b (see FIG. 4a) and the spreader mandrel 6a (see FIG. 4b). In this case the spoke ring 6a preferably has six spokes 62, in order in a preferred way to separate six clamping jaws 3 from one another by a respective spoke 62, ensuring that the clamping jaws 3, seen in the peripheral direction, have the same radial spacing apart and thus from an engagement profile which avoids tilting due to irregular support (see FIG. 4a). In this respect at least three spokes 62 are appropriate for statically defined support of the star-shaped fitting in the forward casing portion 1. Where there are three spokes 62 and six clamping jaws 3, the clamping jaws 3 are then respectively radially aligned in pairs from one another, which likewise ensures a considerably improved reliability of connection compared to prior art. In a preferred way, the number of clamping jaws 3 corresponds to the number of spokes 2. It should be taken into account however in this respect that if the number of clamping jaws 3 corresponds to the number of spokes 62, pushing back the fixing member 5 by means of a spike-like tool, for example a thin screw driver, from the forward side 4 of the snap-fit coupling, in order to push the rear end 3b of the clamping jaws 3 out of engagement with the forward end 4a of the clamp piston 4, as is necessary in the case of change over of the clamping jaws 3, is no longer simply possible, as the spaces lying in the peripheral direction of the clamping jaws 3 between the clamping jaws 3, are occupied by the spokes 62. Therefore it would be advantageous here to undertake pushing back the fixing element 5 from the rear side 15 of the snap-fit coupling, e.g. by means of a rod-like extension which is integral or mountable from the rear casing portion 9, and formed with the fixing element 5, in order to release the fixing element 5 from its locked position by traction stress, i.e. pulling it away from the bearing ends 3b. It would also be imaginable to drill the spreader mandrel 6a hollow internally, in order to push the fixing member 5 through this bore with a spike out of engagement with the clamping jaw ends 3b, this however not being shown in more detail here. If the number of spokes 62 is less than the number of clamping jaws 3, the fixing member 5 can further be pushed out of engagement with the clamping jaw ends 3b from the forward side 14 of the casing 1 by means of a spike. In any case any arrangement with an optional combination of at least three spokes 62 and at least three clamping jaws 3 may be imagined.

In the case of the spoke ring 6b shown in FIG. 4a, the spokes 62 are further integrally connected with an external annular ring 61, which can have on its external periphery for example a thread not shown here for screwing the star-shaped fitting 6 into the casing 1 from the rear side 15. Of course, the spoke ring 6b can also have no external peripheral engagement profile, such for example as a thread, and may simply be inserted into the casing 1 and be axially secured by means of the securing ring 13, as shown in FIG. 1 and FIG. 3. Likewise, the spoke ring 6b may also be formed as a screw sleeve (see FIG. 2) in order to be screwed in from the forward side 14. It is also imaginable that the external annular ring 61 can also have any other type of anti-rotation securing device. In particular with regard to change-over of the spreader mandrel 6a in the assembled condition of the snap-fit coupling by means of screwing out from the forward side 14, the spoke ring 6b must be mounted in a non-rotary manner in the casing portion 1.

Furthermore, the spokes 62 are formed integrally with an internal annular ring 63, which has an aperture 64 for receiving the spreader mandrel 6a; said aperture can be provided on the internal periphery 65 for example with a thread. Then the spreader mandrel 6a can be screwed into the aperture 64, said mandrel having on one end a threaded pin 66, as shown in FIG. 4b. Of course, in this case the spreader mandrel 6a can be connected to the spoke ring 6b in any other way well known to persons skilled in the art, for example by means of a feather-key connection or a push-in connection, and the aperture can also have a polygonal geometry and can be secured axially by means of a securing ring.

FIG. 4c shows a cross-section along the line A—A of FIG. 4a, in which the spoke ring 6b and the spreader mandrel 6a are shown in the assembled condition.

Of course, the embodiment can be formed also without an external annular ring 61 and/or the spoke ring 6b may be integrally connected to the spreader mandrel 6a, this however not being shown in more detail.

FIG. 5 shows a further embodiment of the invention, in which the star-shaped fitting 6' is built up in two parts from a spreader mandrel 6a' and at least three spokes 62'. The assembled condition of such a star-shaped fitting 6' in a snap-fit coupling is shown in FIG. 5; the spokes 62' can be mounted non-rotarily in groove-shaped apertures in the casing 1 in the peripheral direction of the clamping jaws 3. Here also the spokes 62' are either fitted in or secured by means of the securing ring 13 (see FIG. 5) against axial movement. Furthermore, the spokes 62', pointing in the radial direction, are inserted into a spline-shaped profile 66' of the spreader mandrel 6a', e.g. are pressed into position. The lower end of the spokes 62' and the profiled end 66' of the spreader mandrel 6a' can in this case also be of a one-piece construction. This construction of a stamped or cast, one-piece star-shaped fitting 6' is shown in FIGS. 6a and 6b. In addition, there may be seen from the side elevation with half-section a conical insert-ramp 67, which is appropriate for simple assembly of the clamping jaws.

The present invention thus provides a star-shaped fitting for clamp systems, particularly snap-fit couplings by means of which the clamping jaws, seen in the peripheral direction, can be aligned radially, so that irregular support and damage in the engagement area of the connections due to tilting of engaging profiles are avoided.

What is claimed is:

1. A clamping jaw arrangement for a clamp system, comprising:

several clamping jaws coupled to an actuating device and located in a radially spreadable manner in a casing around a spreader mandrel; and a fitting arrangement for the spreader mandrel, the fitting arrangement formed as a star-shaped fitting, which is mounted in the casing in a peripheral area of the clamping jaws and at an inner end of the spreader mandrel, and comprising at least three spokes, which are radially aligned between two respective clamping jaws.

2. The clamping jaw arrangement according to claim 1, wherein the star-shaped fitting is constructed in at least two parts from a spoke ring and the spreader mandrel.

3. The clamping jaw arrangement according to claim 2, wherein the external annular ring has on its outer periphery a thread for screwing into the case.

4. The clamping jaw arrangement according to claim 2, wherein the spoke ring has an external annular ring, which is integrally connected to the spokes.

5. The clamping jaw arrangement according to claim 2, wherein the spreader is screwed to the spoke ring.

6. The clamping jaw arrangement according to claim 5, wherein the star-shaped fitting is in the form a screw sleeve, and is insertable and securable into the casing from the forward side of the connection.

7. The clamping jaw arrangement according to claim 2, wherein the spoke ring has an internal annular ring, which is integrally connected to the spokes.

8. The clamping jaw arrangement according to claim 7, wherein the internal annular ring has an aperture for receiving the spreader mandrel.

9. The clamping jaw arrangement according to claim 7, wherein the spoke ring has an external annular ring, which is integrally connected to the spokes.

10. The clamping jaw arrangement according to claim 1, wherein the star-shaped fitting has an external annular ring integrally formed with the spokes, and connected via the spokes to the spreader mandrel.

11. The clamping jaw arrangement according to claim 10, wherein the external annular ring has on its outer periphery a thread for screwing into the case.

12. The clamping jaw arrangement according to claim 1, wherein the star-shaped fitting is connected to the spreader mandrel by the spokes, one end of the spreader mandrel having a spline-shaped profile, into which the spokes are inserted in the radial direction.

13. The clamping jaw arrangement according to claim 12, wherein the star-shaped fitting is secured axially in the casing by a securing ring.

14. The clamping jaw arrangement according to claim 1, wherein the star-shaped fitting is secured axially in the casing by a securing ring.

15. The clamping jaw arrangement according to claim 1, wherein the star-shaped fitting is in the form a screw sleeve, and is insertable and securable into the casing from the forward side of the connection.

16. A clamp system comprising a casing, an actuating device and a clamping jaw arrangement, the clamping jaw arrangement comprising:

a plurality of clamping jaws coupled to the actuating device and located at least partially within the casing, the jaws positioned circumferentially around a spreader mandrel and being mounted to move radially relative to a longitudinal axis of the mandrel; and a fitting arrangement for the spreader mandrel, the fitting arrangement formed as star-shaped fitting means mounted for causing the jaws to move radially in a more uniform manner than if the fitting means were not used.

17. A clamp system comprising a casing, an actuating device and a clamping jaw arrangement, the clamping jaw arrangement comprising:

a plurality of clamping jaws coupled to the actuating device and located at least partially within the casing, the jaws positioned circumferentially around a spreader mandrel and being mounted to move radially relative to a longitudinal axis of the mandrel; and a fitting arrangement for the spreader mandrel, the fitting arrangement connected to the spreader mandrel and formed as a plurality of radial spokes with each spoke interposed between two adjacent jaws, the spokes engaging at least one jaw to cause the engaged jaws to move radially in a more uniform manner than if the spokes were absent.

18. The clamp system of claim 17 wherein there are an even number of jaws and half that number of spokes, which spokes are evenly spaced among the jaws.

* * * * *